United States Patent [19]
Franks et al.

[11] Patent Number: 5,927,175
[45] Date of Patent: Jul. 27, 1999

[54] STATIONARY AND INDEXABLE CUTTER

[75] Inventors: Lawrence A. Franks; David C. Clark, both of Sturgis, Mich.

[73] Assignee: Burr Oak Tool and Gauge Company, Inc., Sturgis, Mich.

[21] Appl. No.: 08/926,276

[22] Filed: Sep. 5, 1997

Related U.S. Application Data

[63] Continuation of application No. 08/522,756, Sep. 1, 1995, abandoned.

[51] Int. Cl.⁶ .................................. B26D 3/08; B26D 7/26
[52] U.S. Cl. .............................. 83/883; 83/508.2; 83/666; 83/698.51; 83/955; 225/96
[58] Field of Search ..................... 83/885, 880, 51, 83/54, 666, 955, 508.2, 698.51, 665, 676, 883; 225/2, 5, 96.5, 101, 96; 70/DIG. 32

[56] References Cited

U.S. PATENT DOCUMENTS

| | | | |
|---|---|---|---|
| 2,587,732 | 3/1952 | Jaeger | 83/698.51 X |
| 2,706,002 | 4/1955 | Whittamore . | |
| 2,854,042 | 9/1958 | Robinson | 83/666 |
| 3,236,129 | 2/1966 | Bishop . | |
| 3,440,915 | 4/1969 | Weyant | 83/666 |
| 3,568,488 | 3/1971 | Franks . | |
| 3,899,955 | 8/1975 | Selch | 83/665 X |
| 4,112,794 | 9/1978 | Franks et al. . | |
| 4,235,137 | 11/1980 | Harman . | |
| 4,457,199 | 7/1984 | Corcoran . | |
| 4,467,525 | 8/1984 | Logan et al. . | |
| 4,467,684 | 8/1984 | Thorsell | 83/698.51 X |
| 4,524,894 | 6/1985 | Leblond . | |
| 4,693,157 | 9/1987 | Looser | 83/955 |
| 4,694,722 | 9/1987 | Collier et al. . | |
| 4,790,464 | 12/1988 | Bortolin et al. . | |
| 5,133,492 | 7/1992 | Wohrstein et al. . | |
| 5,143,268 | 9/1992 | Stroup, Jr. . | |
| 5,146,823 | 9/1992 | Holmes | 83/955 |
| 5,201,117 | 4/1993 | Wright . | |
| 5,249,345 | 10/1993 | Virsik et al. . | |
| 5,291,814 | 3/1994 | Fierkens | 83/955 |
| 5,388,745 | 2/1995 | Stroup, Sr. . | |
| 5,450,668 | 9/1995 | Stroup, Sr. . | |

FOREIGN PATENT DOCUMENTS 2-198798  8/1990  Japan .

*Primary Examiner*—Rinaldi I. Rada
*Assistant Examiner*—Charles Goodman
*Attorney, Agent, or Firm*—Flynn, Thiel, Boutell & Tanis, P.C.

[57] ABSTRACT

A cutting device for cutting elongate flat-walled tubular stock into preselected lengths which cutting device includes opposed circular cutting blades that are laterally movable to effect a transverse cut across the tubing. The cutting blades are rotatably mounted and engaged with a locking assembly to prevent rotation thereof. Each cutting blade includes a peripheral cutting edge incrementally defining a plurality of contact portions with one contact portion being disposed in an active cutting position and the remainder of the contact portions being disposed in inactive standby positions. Each cutting portion has an arcuate shape so as to minimize the vertical components of the cutting force being applied thereby as the depth of the cut approaches an interior surface of the tubing. Disengagement of the locking assembly permits incremental rotation of the cutting blade so as to move an unused contact portion from an inactive cutting position to the active cutting position to replace a contact portion which has become worn.

8 Claims, 4 Drawing Sheets

STATIONARY AND INDEXABLE CUTTER

This application is a continuation of U.S. Ser. No. 08/522,756, filed Sep. 1, 1995, now abandoned.

FIELD OF THE INVENTION

The invention generally relates to an apparatus for cutting elongate tubular stock into preselected lengths and more particularly, relates to a stationary cutting device for cutting flat-walled tubing, which cutting device has opposed cutting blades that are moved laterally to effect a cut across the upper and lower walls of the tubing.

BACKGROUND OF THE INVENTION

Flat-walled tubing is used in a variety of applications such as heat exchanger units or the like. Due to the variety of applications and the different requirements of each application, it is necessary, therefore, to cut elongate flat-walled tubular stock into a variety of preselected lengths.

To effect cutting of elongate flat-walled tubular stock, it is known to use cutting devices which include rotating circular cutting blades that typically are moved laterally across the respective upper and lower surfaces of the tubular stock and apply a cut thereto. While the most direct way of effecting a cut is to completely cut through the upper and lower tube walls and sever the tubular stock, the material from which the tubular stock is formed, which typically is a ductile metal such as aluminum, deforms relatively easily during such a cutting procedure. As a result, the cutting blades apply undesirable vertical forces to the tube walls such that the material near the interior surfaces of the walls tends to deflect inwardly so as to cause the undesirable formation of radially inwardly projecting burrs and the like.

To minimize the formation of burrs, it is known to apply the rotating cutting blades to the tube walls such that a groove is cut which extends only partially through the thickness of the tube walls. This reduces the deformation of the burrs within the interior of the tubing. Thereafter, the tube is clamped on opposite sides of the grooved portion by clamping devices and at least one of the clamping devices thereafter is displaced relative to the other to break the tube at the groove. However, while reducing the amount of burrs being formed, the rotating cutting blades still apply undesirable forces to the tube walls and consequently, burrs are nevertheless formed by such a procedure.

In an effort to overcome the localized cutting forces associated with the rotating circular cutting blades, U.S. Pat. No. 5,388,745 discloses a cutting apparatus which incorporates opposed cutting blades each having two straight cutting edges on the bottom edge of a cutting insert which are oriented in opposite directions, one of which cuts in a first direction and the other of which cuts in a second direction opposite the first. Each of the cutting edges defines an acute angle with respect to the upper and lower walls being cut. The straight cutting edges are moved transverse to a longitudinal axis of the tubing to cut completely through the wall thickness to sever the tube. As the straight cutting edge is advanced transversely, the depth of the cut increases and the cut progressively advances radially inwards.

However, each of the aforesaid straight cutting edges has a constant angle along its entire length such that the cutting force applied thereby is evenly distributed throughout the thickness of the tube wall. Thus, substantially equal cutting forces are applied at the beginning of the cut when the wall thickness is greatest and after the cut approaches the interior surface of the tubing when the wall thickness is smallest. In addition, since the cutting edges are only located along the bottom edge of a cutting insert and the upper portion is used for mounting of the cutting insert, the cutting blade must be replaced when the cutting edge becomes dull.

Therefore, it is desirable to provide a stationary circular cutting blade which effects cutting of the tube while minimizing the formation of burrs and other undesirable cutting effects. It is also desirable that the cutting blades be indexable so as to provide a plurality of cutting portions on each cutting blade to reduce the frequency of replacing the cutting blade. It is further desirable that each cutting portion be readily movable from an inactive standby position to an active cutting position to replace a previously active cutting portion adjacent thereto which has become dull. Such movement from an inactive standby position to an active cutting position or vice versa is accomplished by incremental rotation of the cutting blade, which blade otherwise remains stationary during a cutting operation. Still further, it is desirable to provide an indexable cutting blade which varies the distribution of the cutting force over the length of the active contact portion such that the vertical component of the cutting force progressively decreases as the cut approaches the interior surface of the tube.

SUMMARY OF THE INVENTION

The invention relates to a cutting device for cutting elongate tubular stock, such as flat-walled tubing used in heat exchangers. The cutting device includes opposed cutting blades that are moved laterally to effect a transverse cut across the upper and lower walls of the tubing. The cutting blades preferably are circular and rotatably mounted to cutting heads of the cutting device. Each of the cutting blades includes a peripheral cutting edge which is segmented into a plurality of contact portions arranged successively therealong whereby one contact portion is fixed in a cutting position by preventing rotation of the cutting blade.

More particularly, each of the cutting blades is indexable in that it includes a hub having a first plurality of notches formed therein and a locking block which includes a projection that seats within one of the notches to prevent rotation of the cutting blade. When the projection is seated within one of the notches, one of the contact portions is positioned for slicing contact with the tubular stock so as to effect a cut thereacross as the cutting blades are moved laterally. Once this particular contact portion which is disposed in the cutting position becomes worn, the locking block may be disengaged and the cutting blade incrementally rotated so as to position an adjacent inactive contact portion forwardly into the cutting position while repositioning the worn contact portion to an inactive position.

In addition, a second plurality of notches may also be provided on the opposite side of the cutting blade so as to be angularly offset with respect to the above-described first plurality of notches. By providing the angular offset, alternating contact portions are associated with either the first or the second plurality of notches. Thus, the cutting blade may be rotated 180° about a vertical axis after the contact portions associated with the first plurality of notches have become worn so that the contact portions associated with the second plurality of notches may be positioned for use.

Still further, by providing a circular shape for the cutting blade, each contact portion has an arcuate shape such that a line tangent to the cutting edge progressively varies along the cutting edge to a horizontal orientation at the maximum depth of the cut so that the vertical component of the cutting forces becomes negligible. Thus, the vertical force component progressively decreases as the depth of the cut approaches the interior surface of the tubing. While the preferred shape is arcuate, it will be appreciated from the teachings of the invention herein that additional shapes for the cutting edge may be provide so long as the vertical force component is decreased toward the interior surface. With the above-described invention, the objects and purposes of the invention are achieved.

DETAILED DESCRIPTION

Figure 1:
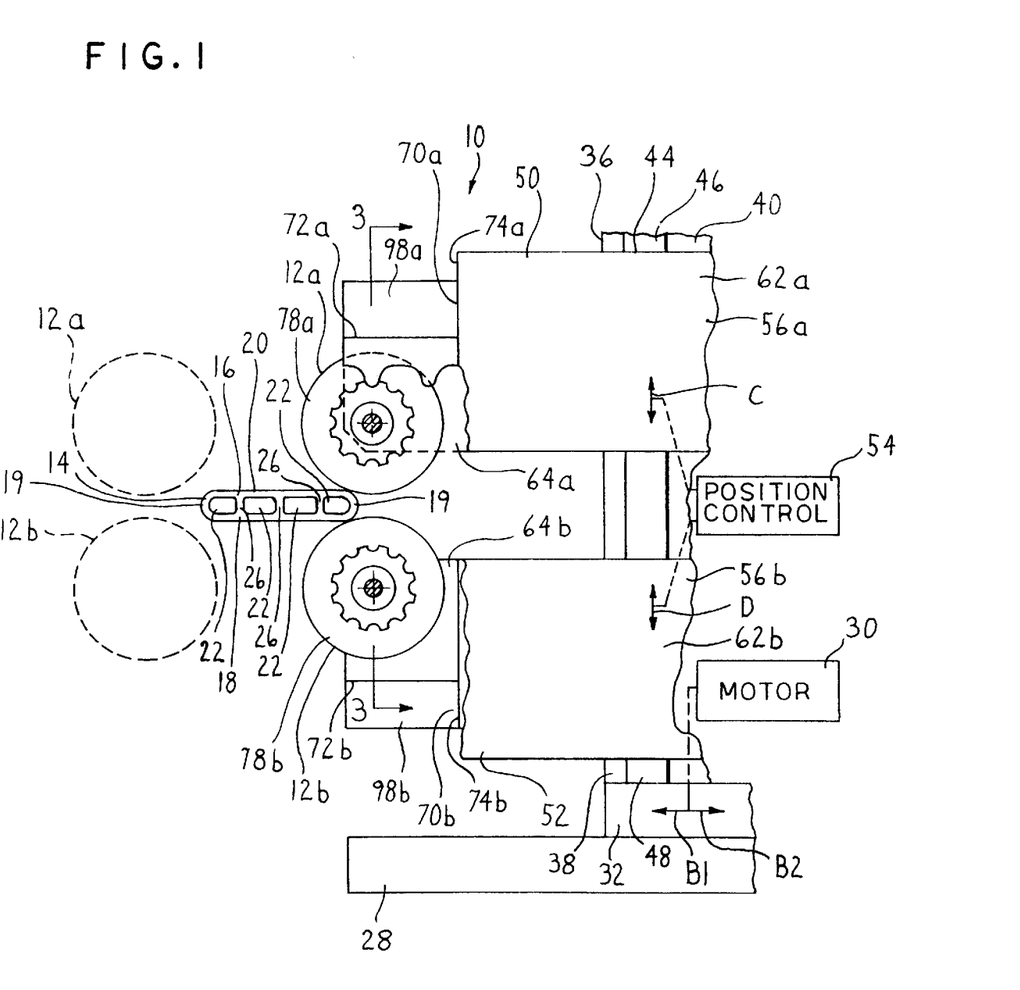
FIG. 1 is a partial upstream side elevational view of a cutting device of the invention having opposed indexable cutting blades illustrated in solid lines in a first position prior to cutting of a tube and in a second position illustrated in phantom outline after cutting of the tube.

The invention is a cutting device 10 as can be seen in FIG. 1 having opposed upper and lower cutting blades 12a and 12b in a spaced relation for cutting elongate flat-walled tubing 14 into preselected lengths, the cutting blades 12a and 12b being indexable and angularly stationary when prevented from rotating.

More particularly, the tubing 14 typically is used for heat exchanger devices (not illustrated). Prior to assembly of the heat exchanger devices, the tubing 14 is provided as a relatively long length of tubular stock as can be seen in FIG. 3 which thereafter is cut by the cutting device 10 of the invention into preselected lengths, which lengths depend upon the particular application for which the tubing 14 is to be used.

Figure 3:
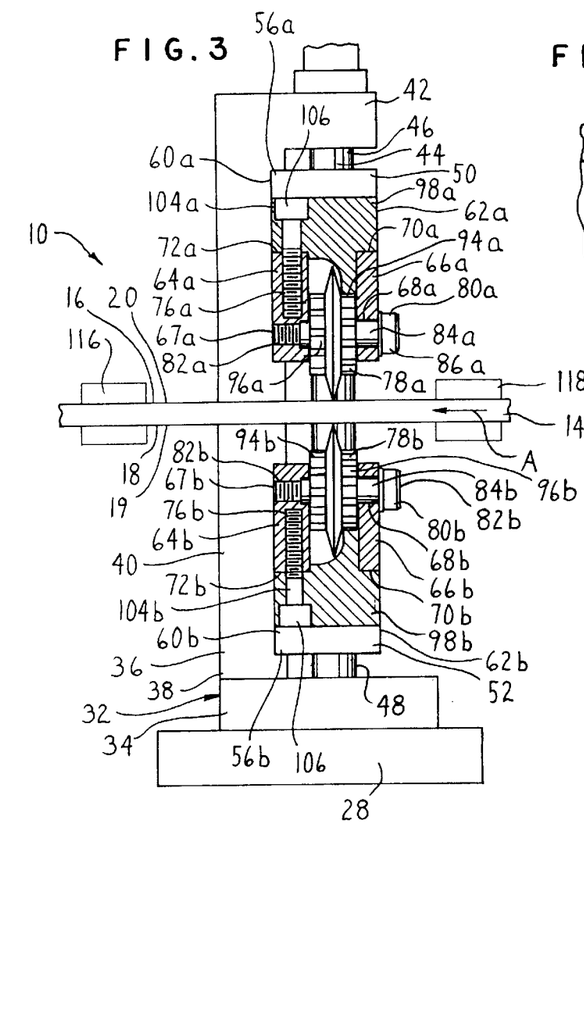
FIG. 3 is a partial front elevational view in cross section illustrating the cutting device as viewed in the direction of arrows 3—3 of FIG. 1.

Referring to FIGS. 1 and 3, the tubing 14 preferably is conveyed to the cutting device 10 in a horizontal orientation by conveying means (not illustrated) of conventional construction. During a conveying operation, the tubing 14 travels forwardly in a downstream feed direction indicated by arrow A (FIG. 3) which feed direction A extends coaxially with respect to the longitudinal axis of the tubing 14.

Figure 4:
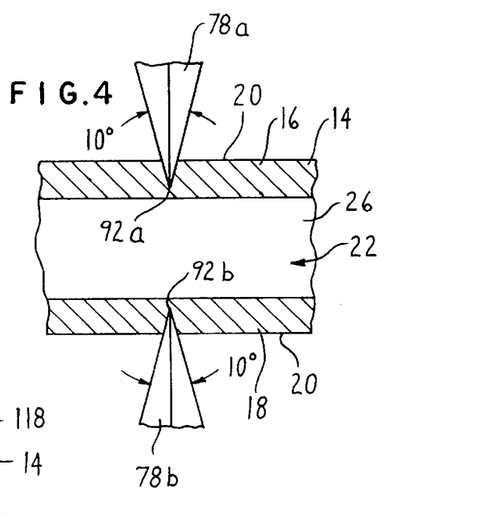
FIG. 4 is an enlarged partial cross sectional view illustrating the opposed cutting blades during cutting of the upper and lower tube walls of the tube as viewed in a cutting direction.

Referring to FIGS. 1 and 4, the tubing 14 includes two opposed upper and lower flat-walled tube walls 16 and 18 and arcuate end walls 19. Each of the tube walls 16 and 18 is defined by an outward facing exterior surface 20 which tube walls 16 and 18 are oriented horizontally during a conveying operation. The tubing 14 also includes a plurality of interior chambers 22 extending longitudinally along the length of the tubing 14 in a parallel, spaced relation. Each of the interior chambers 22 typically are defined by interior tube surfaces, and mutually adjacent pairs of the interior chambers 22 are laterally separated one from the other by substantially vertical interior chamber walls 26 extending between the upper and lower tube walls 16 and 18. Preferably, the tubing 14 is formed of a metal, such as aluminum, for eventual use in a heat exchanger device (not illustrated) although any suitable material may be used. Since the material typically is ductile, the material is prone to the formation of burrs in the region of the tubing 14 adjacent the interior tube surfaces where the tubing 14 is uncut. It should also be appreciated that the specific construction of the tubing 14 may vary from that described herein.

To effect cutting of the tubing 14 into preselected lengths, the cutting device 10 is disposed on one side of the tubing 14 and includes a laterally movable base member 28 which is slidably mounted to a support assembly (not illustrated). More particularly, the base member 28 is operatively mounted to the support assembly (not illustrated) so that the base member 28 is laterally movable leftwardly in a cutting direction as indicated by reference arrow B1, and rightwardly in a return direction opposite the cutting direction B1 as indicated by reference arrow B2.

This lateral movement of the cutting device 10 through the cutting and return directions indicated by reference arrows B1 and B2 is actuated by a motor 30 which is operatively engaged with the base member 28 as diagrammatically illustrated in FIG. 1. The motor 30 is operated using conventional techniques so as to control the starting, stopping, speed and other operating parameters of the cutting device 10.

The cutting device 10 further includes a vertically extending support assembly 32 (FIGS. 1 and 3) which has a rearward opening C-shaped cross section which can be seen in FIG. 3. More specifically, the support assembly 32 includes a bottom support plate 34, which is oriented horizontally and is fixedly secured to an upper surface of the slide member 28 by fasteners or the like, and a vertically oriented L-shaped bracket 36, which extends upwardly from the support plate 34 and has a lower end 38 that is fixedly secured to the support plate 34 proximate a forward edge thereof. The L-shaped bracket 36 comprises a vertical wall 40 which extends upwardly from the lower end 38, and a horizontal top plate 42 cantilevered rearwardly from the vertical wall 40 on the upstream side which top plate 42 is spaced upwardly from the support plate 34 and is oriented parallel thereto.

In addition, the support assembly 32 includes two support columns or members 44 (one of which is not illustrated). Each support column 44 extends vertically between the support plate 34 and the top plate 42 and has top and bottom ends 46 and 48 which are respectively secured to the top plate 42 and the support plate 34. Preferably, each support column 44 is spaced rearwardly away from the vertical wall 40 to define a gap therebetween.

To apply a cut to the tubing 14, opposed upper and lower cutting heads 50 and 52 are slidably mounted to the support columns 44 so as to be movable therealong through respective vertical adjustment paths indicated by reference arrows C and D in FIG. 1. As can be seen in FIGS. 1 and 3, the upper and lower cutting heads 50 and 52 are formed with substantially identical yet opposite, i.e. "mirror image", constructions. As a result, the upper cutting head 50 serves to apply a cut to the upper tube wall 16 and the lower cutting head 52 acts upon the lower tube wall 18 during a cutting operation. To facilitate the description of the components thereof, the reference numerals of the components of the upper cutting head 50 are designated with the reference letter "a" and the identical yet opposite "mirror image" components of the lower cutting head 52 are identified with the same reference numeral designated with "b".

The upper and lower cutting heads 50 and 52 include conventional adjustment means (not illustrated), such as hydraulic cylinders or the like to control vertical movement along the respective vertical adjustment paths C and D. In addition, the adjustment means (not illustrated) restrain the upper and lower cutting heads 50 and 52 in selected positions along the support columns 44 so as to selectively vary the distance between the cutting heads 50 and 52 as well as the resulting depth of the cuts being applied to the tubing 14. Said adjustment means are operatively connected to a position control apparatus 54 which is illustrated diagrammatically in FIG. 1 and is of conventional construction. Any suitable adjustment means may be provided so long as the upper and lower cutting heads 50 and 52 are adjustable along the support column 44 and are thereafter restrained in the selected position.

Figure 2:
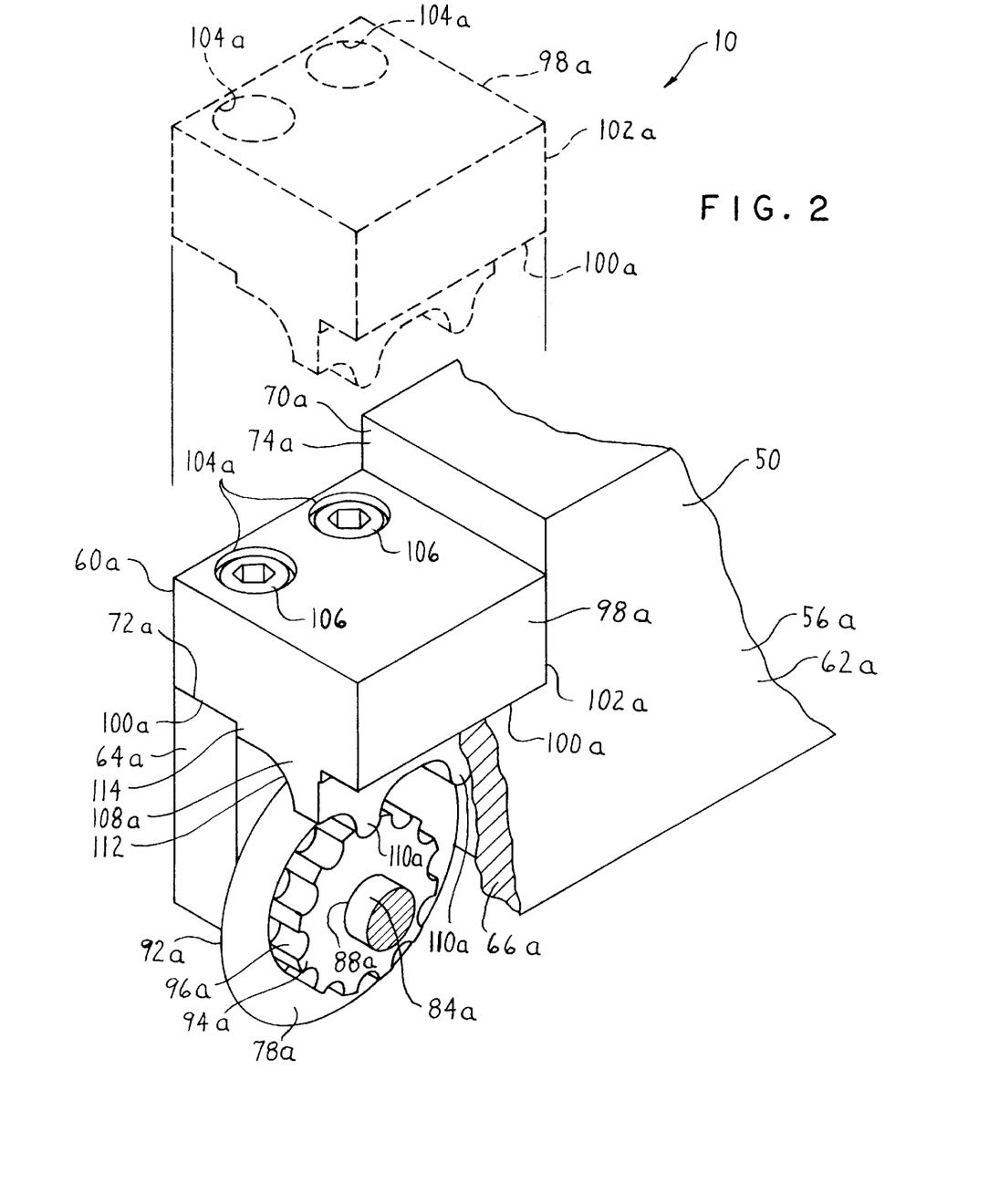
FIG. 2 is an isometric view in partial section illustrating an upper cutting head having a locking block in an assembled position illustrated in solid lines and in a removed position illustrated in phantom outline.

Referring to FIGS. 1–3, the upper cutting head 50 includes a slidable mounting portion 56*a* which slidably receives the support columns 44 therethrough and extends laterally away from the support columns 44 in the cutting direction toward the tubing 14. The slidable mounting portion 56*a* accommodates the above-described adjustment means. In addition, the slidable mounting portion 56*a* includes forward and rearward facing side walls 60*a* and 62*a* which side walls 60*a* and 62*a* have a stepped shape and terminate adjacent the tubing 14 at respective forward and rearward support arms 64*a* and 66*a* as illustrated in FIGS. 2 and 3. The rearward support arm 66*a* is spaced rearwardly from the forward support arm 64*a* on the upstream side so as to define a blade-receiving channel therebetween which is open in three directions, namely, upwardly, downwardly and sidewardly toward the tubing 14. The forward support arm 64*a* also includes a horizontal threaded bore 67*a,* which opens rearwardly into the blade-receiving channel. Similarly, the rearward support arm 66*a* includes an open-ended smooth bore 68*a,* which extends therethrough and is coaxially aligned with the threaded bore 67*a*.

The upper cutting head 50 has a bottom surface which is substantially planar and extends from the support arms 64*a* and 66*a* across the remainder of the slidable mounting portion 56*a*. The opposite upwardly facing surface of the upper cutting head 50, however, has a stepped portion 70*a* formed in each of the forward and rearward support arms 64*a* and 66*a* which stepped portion 70*a* is defined by an upward facing horizontal surface 72*a* and a sidewardly facing vertical surface 74*a*. The upward facing horizontal surface 72*a* of the forward support arm 64*a* also includes a pair of fastener bores 76*a*, which are formed in a laterally spaced relation and extend downwardly into the forward support arm 64*a*.

To facilitate cutting of the tubing 14, a cutting blade 78*a* is rotatably secured in the blade-receiving channel between the forward and rearward support arms 64*a* and 66*a* and secured therein by a pivot screw 80*a* which extends therethrough. More particularly, the pivot screw 80*a* includes a threaded end 82*a* which is threadedly engaged with the threaded bore 67*a* of the forward support arm 64*a*. The pivot screw 80*a* also includes a smooth cylindrical shaft portion 84*a* and a screw head 86*a* to secure the cutting blade 78*a* in position. The pivot screw 80*a* is inserted through the smooth bore 68*a* and a shaft-receiving bore 88*a* of the cutting blade 78*a*, and is threadedly secured with the threaded bore 67*a*.

Figure 5:
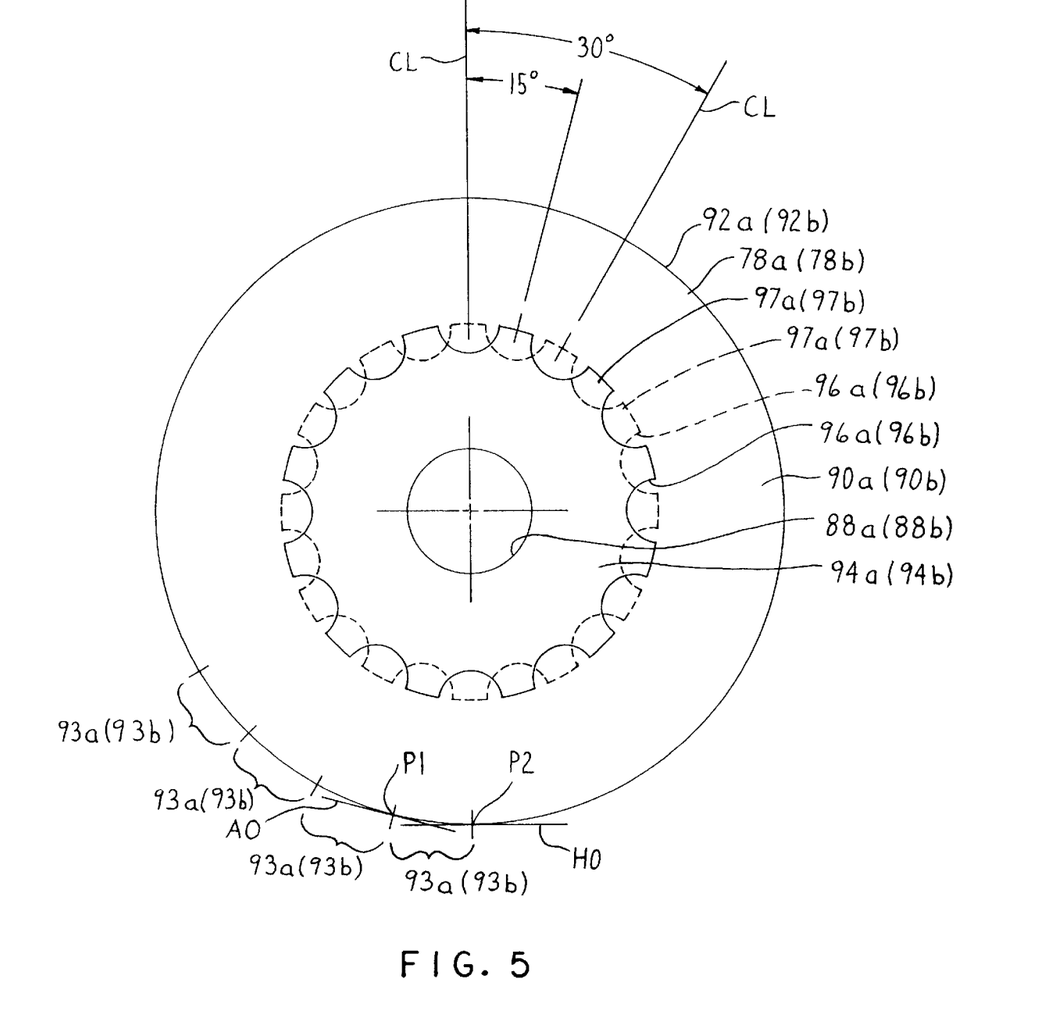
FIG. 5 is a front elevational view of one of the indexable cutting blades.

Referring to FIGS. 1 and 5, the cutting blade 78*a* is formed with the centrally located shaft-receiving bore 88*a* extending therethrough which rotatably receives the shaft portion 84*a* of the pivot screw 80*a*. The shaft-receiving bore 88*a* defines an axis of rotation and is dimensioned so as to permit free rotation about the shaft portion 84*a*. While rotatable, the cutting blade 78*a* will remain angularly stationary during a cutting operation as can be appreciated by the following discussion.

The cutting blade 78*a* preferably has a circular shape and has an annular blade portion 90*a* which tapers radially outwardly and terminates at a cutting edge 92*a* that defines the circumference of the cutting blade 78*a*. Each cutting edge 92*a* is segmented into a plurality of contact portions 93*a* extending therealong one of which contact portions 93*a* is positioned in an active cutting position for contact with the tubing 14 during a cutting operation and the remainder of which contact portions 93*a* are disposed in inactive cutting positions.

By providing the cutting blade 78*a* with a circular shape, the contact portions 93*a* have an arcuate shape along the cutting edge 92*a* which serves to cut through the material of the tubing 14. Due to this arcuate shape, a line tangent to the cutting edge 92*a* varies from an angled orientation (AO) at the point (P1) on the cutting edge 92*a* which first contacts the tubing 14 to a horizontal orientation (HO) at the point (P2) along the contact portion 93*a* at the maximum depth of the cut being applied. When the tangential line is horizontal, the vertical component of the cutting force becomes negligible. Thus, the vertical force component progressively decreases as the depth of the cut approaches the interior surface of the tubing. This minimizes the formation of burrs since the tube wall is thinnest and thereby weakest at the maximum depth of the cut. Thus, as the thickness of the tube wall 16 decreases, so does the vertical force component being applied thereto. While circular, the cutting edge 92*a* may be formed from a plurality of linear segments which extend symmetrically about the rotational axis so long as the vertical force component progressively decreases along the contact portion 93*a*.

Referring to FIGS. 3 and 4, the opposing faces of the blade portion 90*a* preferably have a 10° angle therebetween and taper to a sufficiently sharp edge so as to effect cutting of the material of the tubing 14. As can be seen in FIG. 5, the blade portion 90*a* terminates radially inwardly of the cutting edge 92*a* and more particularly, terminates at a cylindrical central hub 94*a* which has a substantially circular outer periphery and projects forwardly and rearwardly above the blade portion 90*a* on opposite sides thereof as can be seen in FIG. 3.

The hub 94*a* (FIG. 5) includes a first plurality and a second plurality of arcuate notches 96*a* on opposite sides of the blade portion 90*a*, which are formed about the periphery of the hub 94*a* and are separated one from the other by lands 97*a*. Referring to FIG. 5, preferably twelve (12) arcuate notches 96*a* are formed in the hub 94*a* on each side of the cutting blade 78*a*. In addition, each mutually adjacent pair of arcuate notches 96*a* preferably are spaced such that center lines (CL), which extend radially from the rotational axis of the cutting blade 78*a* and bisect each notch 96*a*, are at an angle of 30° relative to the center line (CL) of the arcuate notch 96*a* adjacent thereto. Each of the arcuate notches 96*a* facilitate locking of the cutting blade 78*a* in a non-rotatable condition so as to be angularly stationary as the following discussion will illustrate and define a plurality of cutting positions for said cutting blade 78*a*. Each of the arcuate notches 96*a* and accordingly each of the cutting positions defined thereby corresponds to one of the contact portions 93*a*. The particular contact portion 93*a* which corresponds thereto is that contact portion 93*a* disposed in the active cutting position at that particular angular orientation of the cutting blade 78*a*.

In addition, the first plurality of arcuate notches 96a (illustrated in solid outline in FIG. 5) are angularly offset with respect to the second plurality of arcuate notches 96a disposed on the opposite side of the cutting blade 78a (as illustrated in phantom outline). Preferably, the angular offset is one-half the distance between two adjacent center lines (CL) of two mutually adjacent arcuate notches 96a. In the preferred embodiment, this angular offset is 15°. As a result, alternating contact portions 93a correspond to the first plurality of arcuate notches 96a while the remaining contact portions 93a correspond to the second plurality of notches 96a. With this arrangement the cutting blade 78a may be removed and rotated 180° about a vertical axis preferably after the contact portions 93a corresponding to the first plurality have become worn so that the contact portions 93a associated with the second plurality may be positioned for use.

To hold the cutting blade 78a in an angularly stationary position so that only one contact portion 93a of the cutting edge 92a contacts the tubing 14 during a cutting operation, a locking block 98a (FIG. 2) is removably seated within the stepped portion 70a of the forward and rearward support arm 64a and 66a. The locking block 98a is defined by a downwardly facing bottom surface 100a which is supported in contacting engagement with the upward facing horizontal surface 72a of the stepped portion 70a, and a laterally facing side surface 102a which abuts against the opposing vertical surface 74a of the stepped portion 70a. The locking block 98a includes two laterally spaced apart fastener bores 104a which extend downwardly toward the horizontal surface 72a of the forward support arm 64a and which are in registry with the corresponding fastener bores 76a. Two conventional fasteners 106 are removably inserted through the fastener bores 104a and threadedly engaged with the fastener bores 76aso as to removably secure the locking block 98a onto the forward and rearward support arms 64a and 66a.

The locking block 98a also includes a downwardly depending locking projection 108a which terminates at two engagement teeth 110a, one of which is adapted to lockingly seat within one arcuate notch 96a aligned therewith when the locking block 98a is seated upon the stepped portion 70a so that the cutting blade 78a is maintained in a selected cutting position. The engagement tooth 110a which is lockingly seated within the arcuate notch 96a serves to prevent rotation of the cutting blade 78a so that one contact portion 93a of the cutting edge 92a corresponding to the selected cutting position is positioned in the active cutting position.

The second engagement tooth 110a is laterally spaced apart from the previously described engagement tooth 110a so that a single design of the locking block 98a is used to lock both the upper cutting blade 78a and the lower cutting blade 78b. The second engagement tooth 110a farthest from the tubing 14 therefore is unused during normal operation.

The downwardly projecting locking projection 108a also includes a forward facing arcuate portion 112 which is shaped and dimensioned as illustrated in FIG. 3 so as to accommodate the blade portion 90a of the cutting blade 78a adjacent thereto. The locking projection 108a also includes a rectangular portion 114 with opposite forward and rearward faces which are spaced apart so as to seat between the opposing faces of the forward and rearward support arm 64a and 66a and prevent forward and rearward movement of the locking block 98a in the upstream and downstream directions when seated on the stepped portion 70a.

The locking block 98a is secured during operation in a locking position illustrated in solid outline in FIG. 2 to prevent rotation of the cutting blade 78a, and further is removable as indicated in phantom outline in FIG. 2 so as to permit selective incremental rotation of the cutting blade 78a once the portion of the cutting edge 92a which is being used to cut the tubing 14 becomes dull. This selective rotation of the cutting blade 78a permits a new, unused contact portion 93a of the cutting edge 92a to be rotated from an inactive standby position to the active cutting position for improved cutting of the tubing 14.

The lower cutting head 52 is formed substantially the same as the upper cutting head 50 although the lower cutting head 52 is formed so that the lower cutting blade 78b projects upwardly and is disposed in opposing relation to the upper cutting blade 78a. Since the components of the lower cutting head 52 are a mirror image of the components of the upper cutting head 50, the discussion herein with respect to the upper cutting head 50 applies equally as well to the components of the lower cutting head 52 such that additional discussion of the construction of the components is unnecessary.

Preferably, the upper and lower cutting blades 78a and 78b are spaced apart one from the other so that the respective cutting portions 93 of the respective cutting edges 92a and 92b, which are disposed in the active cutting positions, apply cuts to the tubing 14 which cuts only extend partially through the respective upper and lower tube walls 16 and 18. By applying only a partial cut to the tube walls 16 and 18 as seen in FIG. 4, the formation of any burrs in the tubing 14 after the cutting operation is minimized.

To effect separation of the tubing 14 after the cuts have been applied thereto, upstream and downstream clamping devices 116 and 118 are provided on opposite sides of the portion of the tubing 14 being cut as can be seen in FIG. 3. Once the tubing 14 is positioned for a cut, the upstream and downstream clamping devices 116 and 118 are actuated so as to apply a clamping force to the tubing 14 and hold the tubing 14 stationary. Once the cut has been applied by movement of the cutting blades 78a and 78b in the cutting direction B1 from a pre-cutting position (solid outline) to a post-cutting position (phantom outline), the upstream and downstream clamping devices 116 and 118 are further actuated so as to axially pull the tubing 14 apart at the cutting area. Thus, any burring being formed at the cut of the tubing 14 is minimized. The upstream and downstream clamping devices 116 and 118 are of conventional construction and thus, a detailed description thereof is not required.

In operation, the upper and lower cutting heads 50 and 52 are moved vertically along the vertical position paths C and D in response to the position control 54 so that the upper and lower cutting blades 78a and 78b are spaced a selected distance one from the other. More particularly, the upper and lower cutting blades 78a and 78b preferably are disposed so as to cut partially through the respective upper and lower tube walls 16 and 18 as can be seen in FIG. 4. When disposed in such a position, cutting portions 93 of each of the cutting edges 92a and 92b are positioned in respective active cutting positions for contact with the upper-and lower tube walls 16 and 18. The remainder of the cutting portions 93 remain in inactive standby positions. Due to the arcuate shape of the cutting portion 93 disposed in the active cutting position, the vertical component of the cutting force being applied to the tubing 14 progressively decreases from left to right along the length of the contact portion 93 so as to minimize the formation of burrs and other undesirable deformations.

Once the cutting blades 78a and 78b are set to the desired locations, the upper and lower cutting heads 50 and 52 are slidably moved in conjunction with the slidable base member 28 being actuated by the motor 30 so that the cutting blades 78a and 78b are moved in the cutting direction B1 from the pre-cut position illustrated in FIG. 1 in solid outline to the post-cut position illustrated in phantom outline. Once the groove has been applied to the upper and lower tube walls 16 and 18, the motor 30 is then actuated so as to reverse the upper and lower cutting heads 50 and 52 and move them in the return direction B2 to the pre-cut position. At this time the clamping devices 116 and 118 are moved axially to effect separation of the tubing 14 at the grooves. The above-described operation is repeated as the tubular stock 14 is cut into a plurality of preselected lengths.

After repeated use, however, the cutting portions 93 of the cutting edges 92 which are disposed in the active cutting position eventually will become worn and the quality of the cut being applied to the tubing 14 will decrease. At such time when the quality reaches an undesirable level, the cutting blades 78 are incrementally rotated to a new cutting position. Such adjustment is accomplished by removal of the locking blocks 98a and 98b so as to remove the locking projections 108a and 108b from the corresponding arcuate notches 96a and 96b being restrained thereby. Once removed, the cutting blades 78a are incrementally rotated about the rotational axis so that the next successive arcuate notches 96a and 96b are positioned to receive the locking projections 108a and 108b upon replacement of the locking blocks 98a and 98b. By rotating the cutting blades 78 to new cutting positions, the dull cutting portions 93 are moved from the active cutting position to an inactive standby position while at the same time, the next cutting portion 93 corresponding to the new cutting position is rotated counterclockwise from the inactive standby position to the active cutting position.

Once all of the contact portions 93 corresponding to the 12 arcuate notches 96a on the one side of the cutting blade have been used and become dull, the cutting blade 78 may be removed from the blade-receiving channel, rotated 180° about a vertical axis and then remounted in place. This exposes a new group of arcuate notches 96a, which are angularly offset with respect to the previously used arcuate notches 96a. By exposing the new arcuate notches 96a, the contact portions 93 associated therewith are available for cutting operations. Thus, each cutting blade 78 in the preferred embodiment includes cutting portions 93 so as to minimize the replacement of cutting blades 78.

It should be appreciated that the number of arcuate notches 96a and the cutting portions 93a may be varied. In addition, the arcuate notches 96a may be provided on only one side of the cutting blade 78 if desired.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A cutting device for cutting at least one of opposite first and second walls of an elongate tubular element during intermittent dwells in movement axially along a feed path comprising:

a support member which is disposed laterally adjacent said feed path and is movable toward and away from said tubular element along a cutting path which extends transverse to the feed path; and at least one cutter assembly secured to said support member and including at least one circular indexable cutting blade and rotation support means for supporting said cutting blade for rotation about a rotation axis, said cutting blade having first and second axially facing sides and a peripheral cutting edge disposed around a circumference thereof, said cutting blade including a first pattern of a plurality of notches and a second pattern of a plurality of notches, said cutter assembly further including at least one locking member seatingly received into a selected first notch of said first pattern or a selected second notch of said second pattern, said at least one locking member when seated in said selected first notch of said first pattern effecting an orienting of a first selected arcuate segment of said cutting edge in an active cutting position whereat said first arcuate segment is positioned to contact one of said first and second walls of said elongate tubular walls and effect a cutting of said one of said first and second walls of said elongate tubular member in response to a relative movement between said first selected arcuate segment of said cutting edge and said one of said first and second walls of said elongate tubular member;

cutting blade adjustment means for facilitating a reciprocal movement of said at least one locking member to cause an extraction thereof from said selected first notch of said first pattern to thereby enable said cutting blade to freely rotate about said rotation axis until a selected third notch of said first pattern is aligned with said at least one locking member and to cause an insertion of said locking member into and become seated in said selected third notch of said first pattern to effect an orienting of a second selected arcuate segment of said cutting edge, arcuately spaced a finite distance from said first arcuate segment, in the active cutting position;

said rotation support means including a selective manual operating means for facilitating a selective orienting of said at least one locking member out of alignment with said selected first notch of said first pattern and into alignment and engagement with said selected second notch of said second pattern; and said seated locking member in said selected second notch of said second pattern effecting an orienting of a third selected arcuate segment of said cutting edge in the active cutting position, said third selected arcuate segment of said cutting edge being located in said space between said first and second arcuate segments of said cutting edge to thereby optimize circumferential usage of said cutting edge.

2. The cutting device according to claim 1, wherein said first pattern of notches are angularly offset with respect to said second pattern of notches.

3. The cutting device according to claim 1, wherein said cutting blade includes a hub disposed coaxial with said rotation axis, said hub including a first hub section projecting axially from said first axially facing side and having thereon said first plurality of notches radially outwardly opening therefrom and a second hub section projecting axially from said second axially facing side and having thereon said second plurality of notches radially outwardly opening therefrom, said locking member including a radially inwardly extending projection which is seated within only one of said notches so as to position and restrain said corresponding arcuate section of said cutting blade in said active cutting position.

4. The cutting device according to claim 3, wherein said first pattern of notches are angularly offset with respect to said second pattern of notches.

5. The cutting device according to claim 3, wherein said selective manual operating means includes a stationary cutting blade supporting axle concentric with said rotation axis removably secured to said support member, a removal of said axle enabling said cutting blade to be turned 180° about an axis parallel to said first side so that said second hub section and said selected second notch of said second plurality of notches thereon becomes operatively aligned and engaged with said at least one locking member.

6. The cutting device according to claim 1, wherein a pair of cutter assemblies are provided, and wherein a first said cutting blade of one cutting assembly and a second said cutting blade of the other cutting assembly are provided, said first cutting blade being positioned for slicing contact with said first wall, and said second cutting blade being included in an opposed relation with said first cutting blade and positioned for slicing contact with said second wall.

7. The cutting device according to claim 6, wherein support means are provided for movably supporting said first and second cutting blades on said support member so as to be movable toward and away from one another to accommodate various tubular element thicknesses.

8. The cutting device according to claim 7, wherein said first and second cutting blades are spaced apart such that said respective arcuate segments of said first and second cutting blades which are disposed in said respective active cutting positions cut only partially through said first and second walls corresponding thereto.

\* \* \* \* \*